ROBERT E. HAMILTON
BY James J. Cannon
ATTORNEY.

Feb. 9, 1971 R. E. HAMILTON 3,562,726

DUAL TRACK ENCODER AND DECODER

Filed Jan. 10, 1969 3 Sheets-Sheet 2

INVENTOR.
ROBERT E. HAMILTON
BY James J. Cannon

ATTORNEY.

DUAL TRACK ENCODER AND DECODER

Filed Jan. 10, 1969

3 Sheets-Sheet 3

INVENTOR.
ROBERT E. HAMILTON

BY James J. Cannon

ATTORNEY.

United States Patent Office 3,562,726 Patented Feb. 9, 1971

3,562,726

DUAL TRACK ENCODER AND DECODER

Robert Edward Hamilton, Chelmsford, Mass., assignor to Viatron Computer Systems Corporation, Burlington, Mass.

Filed Jan. 10, 1969, Ser. No. 790,296
Int. Cl. G11b *5/02*
U.S. Cl. 340—174.1 5 Claims

ABSTRACT OF THE DISCLOSURE

A method of encoding and decoding digital data for recording on a media on or through which amplitude and time base changes are capable of being reproduced. Data and timing information are encoded redundantly along two mutually synchronized channels, in one of which timing bits and delayed data "1's" are logically "ORed" together and applied as a composite signal complementing a flip-flop logic element whose alternating output state causes corresponding current reversals in a first channel record head, and in the other channel of which timing bits and delayed data "0's" are similarly "ORed" together and applied as a composite signal complementing a second flip-flop logic element whose alternating output state causes corresponding current reversal in the second channel record head. The data, not being dependent upon a time base in recording, can be played back at rates higher or lower than the original recording speed.

This invention relates to the recording of binary digital data for use in electronic computers, and is directed particularly to a novel and improved method and means for encoding and decoding such data, intelligence or information as a function of time on or through a media that produces amplitude and time base changes. For purposes of illustration and as a practical example of application of the encoding and decoding method disclosed, the use of magnetic tape is described herein as the recording media.

Various methods have heretofore been devised for writing or coding digital information in the form of electrical pulses or changes in D-C current limits representative of "1's" and "0's" of the binary system of numbers conventionally used in electronic computers. Typically, the writing or recording of such data on magnetic tape is accomplished by current switching through the record head winding between different, pre-determined levels while the magnetic tapes move continuously past the record head. The tape area, while moving immediately below the head, is magnetized so that there is recorded a continuous and changing magnetic flux field pattern indicative of the process in a channel extending along the length of the tape. The channel width is determined by the width of the magnetic gap of the recording head, and successive elements, called "bits" of the digital data are bounded along the length of the recorded channel by imaginary lines forming a magnetic field zone called a "cell."

Because of the increasingly high speed demands of digital data systems, many problems are presented in the recording or writing and reading of digital information on magnetic tape. Cell lengths have necessarily become smaller and smaller, correspondingly increasing pulse-packing densities and thereby making the recording and reading of the data without errors increasingly demanding and difficult. Moreover, with coding and decoding systems heretofore devised, decoding is on a time basis, necessitating phase shift or time delay changes in instances where play-back is desired or required at rates higher or lower than the original writing or recording speed. It is, accordingly, the principal object of this invention to provide a novel and improved method and means for encoding and decoding digital data that obviates deficiencies of such encoding and decoding systems heretofore devised and which, when used in conjunction with a recording media such as magnetic tape, will permit direct play-back at rates higher or lower than the recording speed.

Another object of the invention is to provide a two-channel encoding and decoding method for digital data wherein some of the timing information is recorded redundantly, thereby enabling the data to be decoded at least fifty percent of the time even if a timing bit is missing, and permitting the use of either channel for cross-check of the other channel for errors.

Still another object of the invention is to provide an encoding and decoding method for digital data of the character above-deescribed wherein tape speed variations are irrelevant, assuming the speed of the tape past the reading or pick-up head remains above the lowest limit sufficient to produce a minimum reproduce signal, the time and distance between digital bits being unimportant. In this connection it is to be noted that, as hereinbelow more particularly described, it is only required that mutual time displacement between the two channels of the system be kept within certain tolerance limits.

Yet another object of the invention is to provide a new and improved encoding and decoding method and means of the character described wherein digital bit signal polarity change, rather than change in D-C level, conveys the information, and wherein signal peak sensing circuits are used to decode the information. Signal amplitude variations are thereby rendered relatively unimportant, enhancing accuracy of transmission. Such signal polarity change modulation has the additional advantage of being suitable for telephone line and radio transmission wherein detection upon decoding may be effected either by zero-crossing detection or peak detection, as may be most suitable.

Other objects, features and advantages of the invention will be apparent from the following description when read with reference to the accompanying drawings. In the drawings, wherein like reference numerals denote the corresponding parts throughout the several views:

FIG. 1 illustrates, diagrammatically, a conventional single-channel data encoding system;

FIGS. 2*a*, 2*b* and 2*c* are graphic representations of the signal wave trains of the timing bits, data bits and composite output, respectively, of the conventional encoding system of FIG. 1;

BACKGROUND OF THE INVENTION

Figure 1:
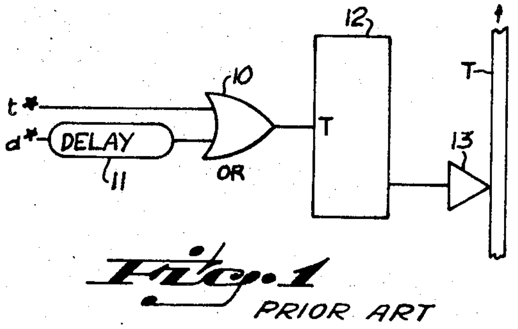
FIG. 1 PRIOR ART
Figure 2:
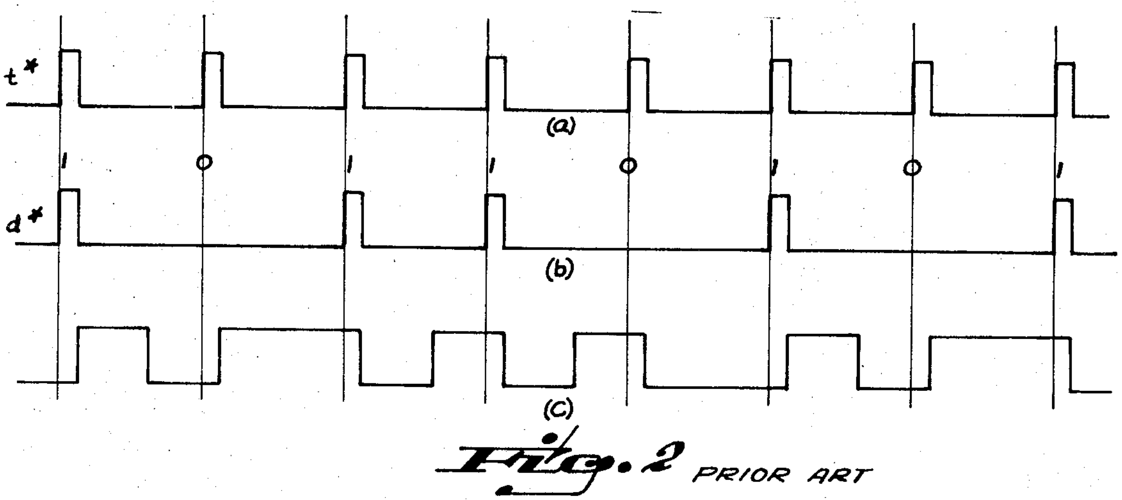
FIG. 2 PRIOR ART

The method of encoding data and time information to a single information channel using various phase or frequency doubling techniques is well known. In such systems, incoming data and timing signals are logically "ORed" together after data is delayed for time equal to one-half the data stream period. Thus, as illustrated in FIG. 1, the timing and data bits, designated $t^*$ and $d^*$, respectively, are fed into a logical "OR" network designated 10, the data bits $d^*$ first being delayed for a time equal to one-half the data stream period in a delay network 11. The resulting composite signal comprises a flip-flop logic network 12 whose alternating output state causes reversals of current in a recording head 13. Thus, the flux pattern on the tape T is reversed every time a timing bit or data "1" (or, alternatively, "0") occurs. FIG. 2*a* illustrates the sequential timing bits or pulses, FIG. 2*b* illustrates data "1" timing bits representative of digital data binary numerical bits to be recorded and FIG. 2*c* represents the composite output of the flip-flop network 12. It will thus be apparent that in the limiting case of all data "0's" to be recorded a square wave of a frequency equal to the timing rate or period would be generated. If all data "1's" were presented for recording, the generated square wave would be at two times the timing rate or period.

It is to be particularly noted that in conventional encoding and decoding methods, as distinguished from the method of the present invention, time and distance measurements are required to determine whether an information bit represented by a flux reversal is actually a timing bit or a data bit.

DESCRIPTION OF THE INVENTION

In the method of the invention, two tracks are recorded, one recording data "1's" and the other recording data "0's," utilizing the method illustrated and described above in connection with FIGS. 1 and 2 of the drawings. Thus, as illustrated in FIG. 5, two square wave trains will be produced, TRACK A illustrates the encoding of the data "1's" with flux reversals, and TRACK B illustrates the encoding of the data "0's" with flux reversals.

Figures 3, 5:
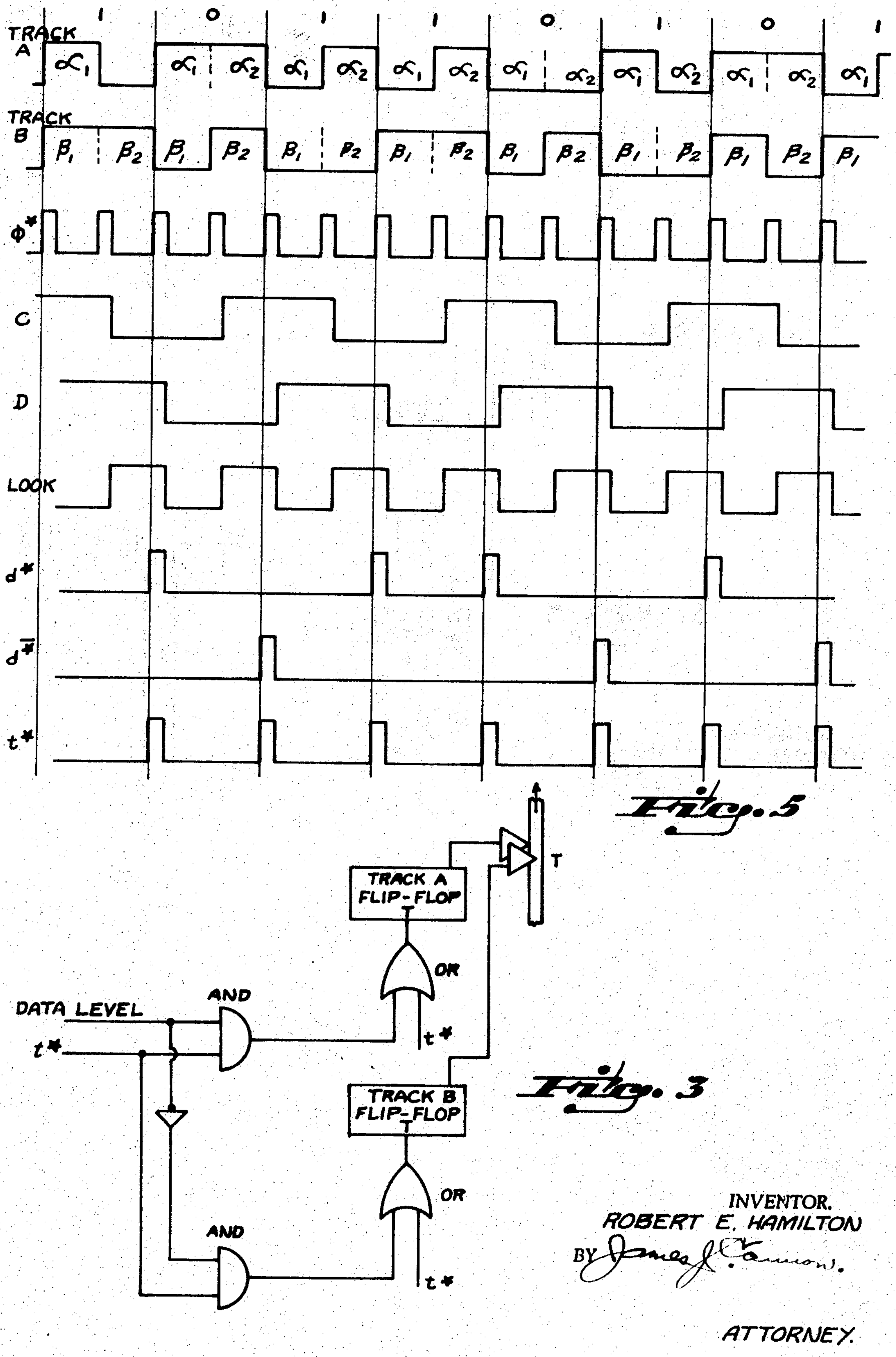
FIG. 3 is a logic diagram for the encoding or writing of the data.
FIG. 5 is a graphic representation of the various waveforms of the written data as recorded with the system of the present invention, together with waveforms of the decoded data signals and the waveform signals generated in the logic decoding system of FIG. 7, by means of which decoding is achieved.

FIG. 3 illustrates the write logic diagram wherein incoming data and timing bits are logically "ORed" together after the data is delayed for one-half the bit cell length by the system clock. Data level input signals are provided (inverted with respect to channel B) for selectively recording data "1" bits on TRACK A and data "0" bits on TRACK B. In each channel or track, the resulting composite signal compliments a flip-flop element whose alternating output state causes write currents to cycle through the respective recording heads. Flux generated by these changing write currents saturate the magnetic tape in alternating directions. The flux changes due to timing bits are guaranteed on both channels and each data bit causes a change in only one of the channels. In this connection, it is to be noted that the lowest fundamental frequency on either track will be the data rate, that is, the timing bit frequency. It is also to be noted that the tracks contain all of the timing information required for decoding on a time independent basis and that mutually-successive timing bits in either channel define a "time cell." Each channel, moreover, also contains data information; the first, designated channel or TRACK A, having a flux reversal whenever the data is a logical "1" and the second, designated channel B, having a flux reversal whenever a data "0" occurs. As noted above, the data information is contained as a flux reversal at approximately the half-way point in the time cell. Particularly to be noted is that whenever channel A contains a data transition representative of logical data, channel B does not, and, conversely, whenever channel B does, channel A does not.

Figure 4:
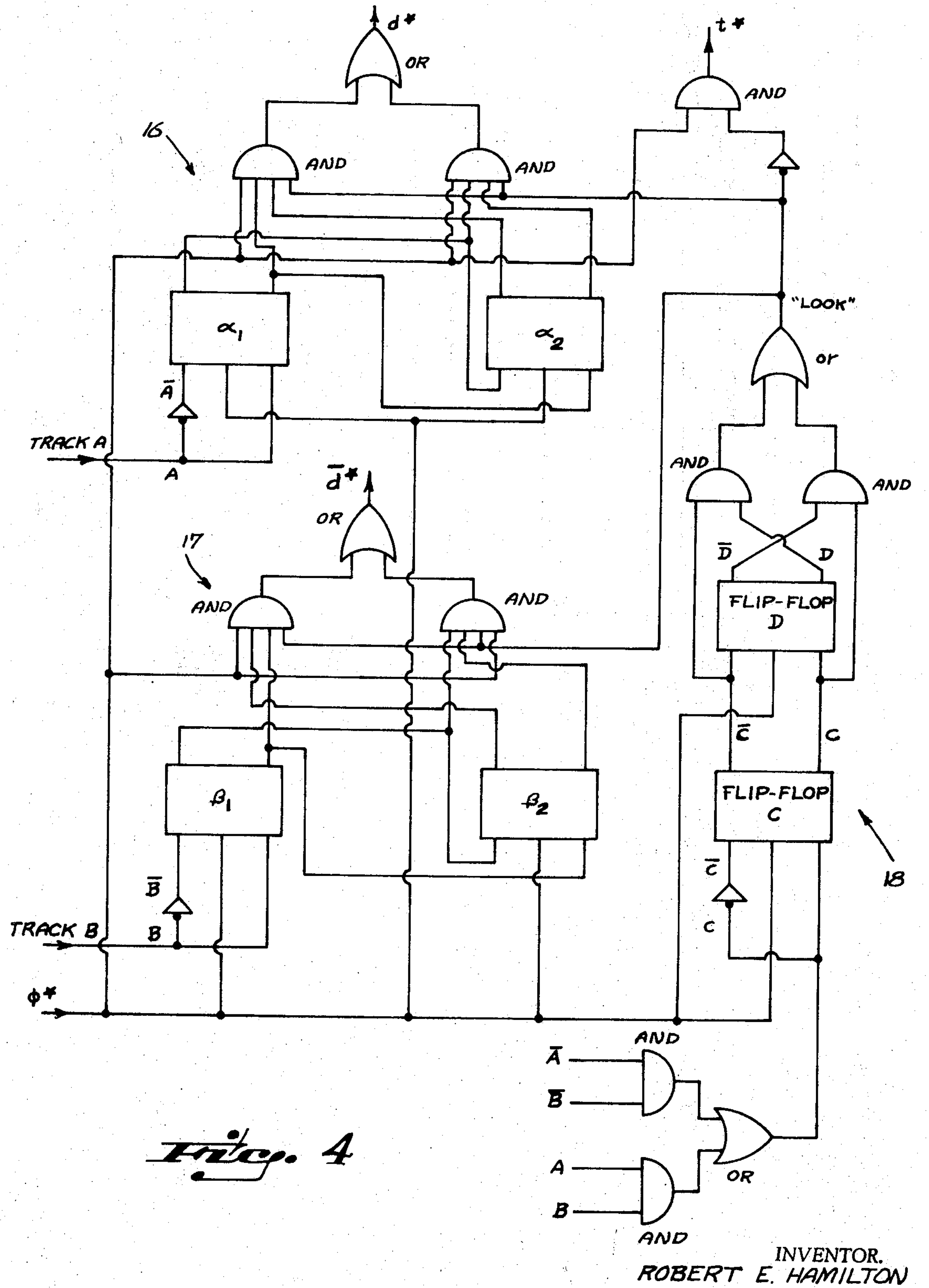
FIG. 4 is a logic diagram for the decoding of the data encoded by the method of the invention.

Referring now to FIGS. 5 and 4 and considering the decoding process, the initial stages of the decoder are conventional preamplifiers deriving their inputs from a pair of ganged magnetic pick-up heads, one for each channel (not illustrated) which convert the signals to a level suitable for digital logic, each data channel remaining independent at this stage of the decoder. Once digital signals are thus generated in a conventional manner, various unique and useful features of the process will be observed, as is hereinbelow described.

Assume information in each channel is shifted in a storage shift register. A bit (or time cell) of channel A consists of two parts ($\alpha_1$ and $\alpha_2$) and each time cell in B consists of $\beta_1$ and $\beta_2$ (as shown in FIG. 5). Each half of a time cell is stored independently (see FIG. 4).

Now if $\alpha_1$ is unequal to $\alpha_2$ then the bit encoded was originally a "1" (notice that channel B should contain $\beta_1$ equal to $\beta_2$). If, on the other hand, $\alpha_1=\alpha_2$ (of course now $\beta_1\neq\beta_2$ should be stored in channel B register), the data bit was a "0." Since the time or length of a time cell is irrelevant as long as both information channels remain synchronized, one may sample their status.

There are four possible states for each bit being decoded:

$$\alpha_1=\alpha_2:\beta_1=\beta_2$$
$$\alpha_1=\alpha_2:\beta_1\neq\beta_2$$
$$\alpha_1\neq\alpha_2:\beta_1=\beta_2$$
$$\alpha_1\neq\alpha_2:\beta_1\neq\beta_2$$

Only two states, however:

$$\alpha_1=\alpha_2:\beta_1\neq\beta_2$$
$$\alpha_1\neq\alpha_2:\beta_1=\beta_2$$

will exist when the data is correct. Consequently, an error detection program can be implemented to detect these conditions. Moreover, the signal can be uniquely decoded without reference to an absolute time base. Thus, the bit cells can be as long as desired without the need for adjustments to be made. Since only the two states of the possible four are used to correctly decode the data or information (exclusive "OR" type function), the two remaining states can be used to detect an error. The logic circuitry to implement the decoding and error-detection process is illustrated in FIG. 4, the elements thereof being labeled to be consistent with the decoding wave forms of FIG. 5.

The decoding logic illustrated in FIG. 4 consists of three major elements; the $\alpha$ shift-register and decoder 16, an identical $\beta$ shift register and decoder 17, and the C–D shift register and decoder 18.

The $\alpha$ shift-register is used to store both halves of a time cell and upon a "LOOK" command, the decoder compares $\alpha_1$ and $\alpha_2$. If $\alpha_1\neq\alpha_2$, the time cell contains a data 1 and coincident with a clock pulse $\phi$ of double the basic data rate, a true $d^*$ is present at the decoder output. If, on the other hand, $\alpha_1=\alpha_2$ during the LOOK command, the time cell contains a data zero and no pulse is present at the output.

The $\beta$ shift-register operates in a similar fashion. If $\beta_1\neq\beta_2$, during the LOOK command, a pulse is generated at the $d^*$ output indicating a data zero is contained in the time cell. Conversely if $\beta_1=\beta_2$ then a data one is decoded and no pulse appears at the $\bar{d}^*$ output.

The C–D shift-register and decoder defines the LOOK internal unambiguously. The and shift-registers are queried only when the LOOK command is true and this occurs only during the second half of a time cell.

By use of the digital data encoding and decoding process hereinabove described, wherein two tracks are used even though each track is essentially self-clocking, the following advantages will be apparent:

(1) Information can be decoded on other than a time basis.

(2) If timing pulses are generated in the decoding process, one of them can be absent without disturbing the information.

(3) Each channel can be used to check the data on the other channel and by logic manipulation error signals can be developed.

(4) Amplitude changes will not affect the data, since flux changes, rather than amplitude level, are used to control the decoding process.

(5) Zero signal detectors may be employed. Thus, the signal may be limited similarly as done in frequency modulation detection with the advantage of being able to detect a signal which has been severely reduced in amplitude.

(6) Tape speed variations are insignificant, since the time and/or distance between bit cell boundaries is irrelevant.

While the digital data encoding and decoding method is described herein in connection with the use of magnetic tape as the recording media, it is to be understood that the process could as well be applied with the use of any other media, such as photographic film, through which amplitude and time-base changes are capable of being reproduced.

What I claim is new and desire to secure by Letters Patent is:

1. The method of redundantly recording, as a function of time on two separate channels of a media capable of recording amplitude and time base changes, binary digital data in the form of successive amplitude bits representative of data "1's" and "0's" occurring one each in time cells bounded by successively occuring time "bits," which comprises the steps of delaying data "1's" for approximately one-half the bit cell length and applying them together with the timing bits as a logically "ORed" composite signal complementing a first flip-flop logic element whose alternating output state causes corresponding current reversals in a first channel transducer, while at the same time similarly delaying data "0's" for approximately one-half the bit cell length and applying them together with the timing bits as a second logically "ORed" component signal complementing a second flip-flop logic element whose alternating output state causes corresponding current reversals in a second channel transducer, and finally impressing the outputs of said first and second channel transducers along two mutually synchronized channels of said media.

2. The method of redundantly recording, as a function of time on two separate channels of magnetic tape, binary digital data in the form of successive amplitude bits representative of "1's" and "0's" occurring one each in time cells bounded by successively occurring time "bits," which comprises the steps of delaying the data "1's" for approximately one-half the bit cell length and applying them together with the timing bits as a logically "ORed" composite signal complementing a first flip-flop logic element whose alternating output state causes corresponding current reversals in the first channel recording head, while at the same time similarly delaying data "0's" for approximately one-half the bit cell length and applying them together with the timing bits as a second logically "ORed" composite signal complementing a second flip-flop logic element whose alternating output state causes corresponding current reversals in a second channel recording head, and finally simultaneously recording the outputs of said first and second channel recording heads along two mutually synchronized channels of said magnetic tape.

3. Logic circuitry for redundantly recording, as a function of time on two separate channels of a media capable of recording amplitude and time base changes, binary digital data in the form of successive amplitude bits representative of data "1's" and "0's" occurring one each in time cells bounded by successively occurring time "bits," comprising means for delaying the data "1" and the data "0" signals for approximately one-half their respective bit cell lengths, a data level input signal, a first logic "AND" element, the data level input signal and the digital data signal being applied as the input to said first logic "AND" element, a first logic "OR" element, the composite output of said logic "AND" element being applied to the input of said first logic "OR" element together with the timing bit signal, a first channel flip-flop logic element, the output of said first logic "OR" element being applied as a control signal to said first channel flip-flop logic element, a first channel transducer, the output signal of said first channel flip-flop logic element being applied to energize said first channel transducer, a second logic "AND" element, an inverter, the data level input signal being applied, through said inverter, as the input, together with the digital data signal, to said second logic "AND" element, a second logic "OR" element, the composite output of said second logic "AND" element being applied to the input of said second logic "OR" element together with the timing bit signal, a second channel flip-flop logic element, the output of said second logic "OR" element being applied as a control signal to said second channel flip-flop logic element, and a second channel transducer, the output signal of said second channel flip-flop logic element being applied to energize said second channel transducer.

4. Logic circuitry as defined in claim 3 wherein the recording media is magnetic tape, and wherein said first and second channel transducers are relatively fixed recording heads adapted to record along separate tracks of the moving tape.

5. The method of uniquely decoding, without reference to an absolute time base, binary digital data redundantly recorded as in the method of claim 2, and wherein the data bits are each divided into time elements of approximately one-half cell length, the first and second halves of the "1's" data bits being designated $\alpha_1$ and $\alpha_2$, respectively, and the first and second halves of the "0's" data bits being designated $\beta_1$ and $\beta_2$ respectively, which comprises storing both halves of the "1's" data bits in an $\alpha$ shift register, while at the same time storing both halves of the "0's" data bits in a $\beta$ shift register, and then comparing both halves ($\alpha_1$ and $\alpha_2$) of the respective "1's" data bits for equality or non-equality while at the same time comparing both halves ($\beta_1$ and $\beta_2$) of the respective "0's" data bits for equality or non-equality, during "LOOK" command intervals comprising approximately the second half of the time cell, the non-equality of the half bits in either the "1's" or "0's" data bits being representative, mutually exclusively, of true respective data bits.

References Cited

UNITED STATES PATENTS

| | | | |
|---|---|---|---|
| 3,228,016 | 1/1966 | Hopner | 340—174.1 |
| 3,274,611 | 9/1966 | Brown et al. | 340—174.1 |
| 3,281,804 | 10/1966 | Dirks | 340—174.1 |
| 3,373,415 | 3/1968 | Gabor | 340—174.1 |

BERNARD KONICK, Primary Examiner

V. P. CANNEY, Assistant Examiner

U.S. Cl. X.R.

346—74